(12) United States Patent
Kim et al.

(10) Patent No.: US 8,080,618 B2
(45) Date of Patent: Dec. 20, 2011

(54) THERMOPLASTIC RESIN COMPOSITION WITH GOOD HEAT STABILITY, LIGHT STABILITY, AND IMPACT STRENGTH

(75) Inventors: Jun Myung Kim, Uiwang-si (KR); Jin Hwan Choi, Uiwang-si (KR); Jee Kwon Park, Uiwang-si (KR); Jae Won Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 226 days.

(21) Appl. No.: 12/477,530

(22) Filed: Jun. 3, 2009

(65) Prior Publication Data
US 2009/0318588 A1 Dec. 24, 2009

(30) Foreign Application Priority Data

Jun. 19, 2008 (KR) ................ 10-2008-0057852

(51) Int. Cl.
C08L 67/02 (2006.01)
C08L 63/00 (2006.01)
C08L 63/10 (2006.01)
C08L 25/08 (2006.01)

(52) U.S. Cl. ........ 525/438; 525/437; 525/445; 525/449; 525/533

(58) Field of Classification Search ........... 525/437, 525/438, 445, 449, 533
See application file for complete search history.

(56) References Cited

U.S. PATENT DOCUMENTS

| | | | |
|---|---|---|---|
| 5,310,799 A * | 5/1994 | Carson et al. ............. 525/176 |
| 5,523,135 A * | 6/1996 | Shiwaku et al. ........... 428/35.7 |
| 6,277,905 B1 | 8/2001 | Keep | |
| 7,612,131 B2 | 11/2009 | Yamada | |
| 7,919,559 B2 | 4/2011 | Park et al. | |
| 2007/0173629 A1 * | 7/2007 | Shiga et al. ............... 528/272 |
| 2007/0213458 A1 | 9/2007 | Topoulos | |
| 2008/0153954 A1 | 6/2008 | Arpin | |
| 2009/0012217 A1 | 1/2009 | Jung et al. | |
| 2009/0181199 A1 | 7/2009 | Agarwal et al. | |
| 2009/0318588 A1 | 12/2009 | Kim et al. | |
| 2010/0010146 A1 | 1/2010 | Lee et al. | |

FOREIGN PATENT DOCUMENTS

| | | |
|---|---|---|
| DE | 19837701 A1 * | 2/2000 |
| EP | 489912 A1 | 6/1992 |
| JP | 1-263149 | 10/1989 |
| JP | 06-212064 | 8/1994 |
| JP | 6-248159 | 9/1994 |
| JP | 11158358 A * | 6/1999 |
| JP | 2003-138135 | 5/2003 |
| JP | 2004-018793 | 1/2004 |
| JP | 2006-143955 | 6/2006 |
| KR | 159256 | 8/1998 |
| KR | 100830418 B1 * | 5/2008 |

OTHER PUBLICATIONS

Machine translation of JP 11158358 A, provided by the JPO website (no date).*
Machine translation of KR 100830418 B1, provided by the KIPO website (no date).*
Machine translation of DE 19837701 A1, provided by the EPO website (no date).*
Office Action in commonly owned U.S. Appl. No. 12/335,901 mailed Aug. 18, 2010, pp. 1-10.
Notice of Allowance in commonly owned U.S. Appl. No. 12/335,901 mailed Dec. 3, 2010, pp. 1-7.
Office Action in commonly owned U.S. Appl. No. 12/499,340 dated Mar. 16, 2011, pp. 1-13.
English Abstract of KR 159256.

* cited by examiner

*Primary Examiner* — Michael J Feely
(74) *Attorney, Agent, or Firm* — Summa, Addition & Ashe, P.A.

(57) ABSTRACT

Disclosed herein is a thermoplastic resin composition with good heat stability, light stability and impact strength. In an exemplary embodiment, the thermoplastic resin composition comprises (A) about 10 to about 99 parts by weight of an epoxy group-containing styrenic resin; (B) about 1 to about 90 parts by weight of a polyester resin; (C) about 0.1 to about 10 parts by weight of a thermoplastic polyester resin comprising a cycloaliphatic diol such as cyclohexane dimethanol, per about 100 parts by weight of a base resin comprising (A)+(B); (D) about 0.05 to about 2 parts by weight of a hindered phenolic compound, per about 100 parts by weight of a base resin comprising (A)+(B); (E) about 0.05 to about 4 parts by weight of a phosphite compound, per about 100 parts by weight of a base resin comprising (A)+(B); and (F) about 0.2 to about 6 parts by weight of a compound comprising a HALS compound, benzotriazol based compound, or a combination thereof, per about 100 parts by weight of a base resin comprising (A)+(B).

20 Claims, No Drawings

THERMOPLASTIC RESIN COMPOSITION WITH GOOD HEAT STABILITY, LIGHT STABILITY, AND IMPACT STRENGTH

CROSS-REFERENCE TO RELATED APPLICATION

This application claims priority from Korean Patent Application No. 10-2008-57852 filed on Jun. 19, 2008 in the Korean Intellectual Property Office, the disclosure of which is incorporated herein by reference in its entirety.

FIELD OF THE INVENTION

The present invention relates to a thermoplastic resin composition with good heat stability, light stability and impact strength.

BACKGROUND OF THE INVENTION

Acrylonitrile-butadiene-styrene copolymer resin (hereinafter referred to as 'ABS resin') is a resin in which a copolymer of styrenic monomer and acrylonitrile monomer grafted to butadiene rubbery polymer (hereinafter referred to as 'g-ABS') is dispersed in a matrix of styrene-acrylonitrile copolymer resin (hereinafter referred to as 'SAN'). ABS resin has a good balance of properties such as processability, impact resistance, chemical resistance, heat resistance and mechanical strength, and thus it has been widely used in the production of internal or external parts of electrical and electronic goods, parts of automobiles, general goods, and the like.

However, ABS resin can physically or chemically decompose during extrusion or injection molding and it easily darkens or turns yellow or forms a silver streak due to a thermal oxidation reaction, which makes it unusable in many products. Therefore, an antioxidant is generally added to ABS resin to reduce or prevent oxidation decomposition.

Antioxidants are typically classified as primary antioxidants such as hindered phenol compounds and secondary aromatic amines; and secondary antioxidants such as phosphites, thioesters and the like. Each antioxidant may provide good heat stability, and a combination of two or more antioxidants may provide even greater heat stability.

However, ABS resins are susceptible to surface appearance problems such as discoloration, gas silver and the like due to high shear stress and heat during mold processing of a thin film or a large-scale molded article, even when a combination of two or more of antioxidants is employed. Further, butadiene in ABS resin has poor weather resistance, and thus it is susceptible to photo-oxidation when ABS resin is exposed to exterior or outdoor environments over a long period of time. As a result, photo-oxidation can decompose or discolor ABS resin and decrease the light stability of ABS resin. Thus, there is a need to develop an ABS resin which has good stability to heat and light.

Polyester resins typically have a structure including short chains, and thus may not bend easily. Accordingly, polyester resins can have good rigidity, electrical properties, weather resistance and heat resistance, and the tensile strength of polyester resins may not be affected even after long term exposure to high temperatures. Further, polyester resins have good resistance to various oils such as diesel oil, and good dimensional stability and processability. Accordingly, polyester resins have been widely used in various industrial fields such as automobile parts, parts of electric and electronic goods and the like. Moreover, the surfaces of polyester resin articles have a good appearance, gloss and good plating properties, for example, good adhesiveness for aluminum vacuum plating or chrome plating, so that they are suitable for a headlamp bezel of a car.

However, ester bonds in the polyester chain are susceptible to hydrolysis so that the molecular weight of the polyester resins may decrease when they are exposed to high temperatures or high humidity over a long period of time. As a result, properties such as rigidity and impact resistance of polyester resins can be degraded.

Korean Patent No. 159,256 discloses a method of alloying polyester resin with ABS resin in order to solve the above problems. However, the polyester-ABS resin alloy has poor heat stability due to insufficient compatibility which may cause a gas release. Further, the alloy has poor impact strength due to the degradation of polyester resin.

SUMMARY OF THE INVENTION

Accordingly, the present inventors have developed a thermoplastic resin composition having a good balance of properties such as heat stability, light stability, gloss, chemical resistance, impact resistance, and the like by introducing a polyester resin including a cycloaliphatic diol such as cyclohexane dimethanol, a hindered phenolic compound, a phosphite compound and a specific UV stabilizer to an epoxy group-containing styrenic resin to improve compatibility between the styrene resin and the polyester resin.

In an exemplary embodiment, the thermoplastic resin composition comprises (A) about 10 to about 99 parts by weight of an epoxy group-containing styrenic resin; (B) about 1 to about 90 parts by weight of a polyester resin; (C) about 0.1 to about 10 parts by weight of a thermoplastic polyester resin comprising a cycloaliphatic diol such as cyclohexane dimethanol, per about 100 parts by weight of a base resin comprising (A)+(B); (D) about 0.05 to about 2 parts by weight of a hindered phenolic compound, per about 100 parts by weight of a base resin comprising (A)+(B); (E) about 0.05 to about 4 parts by weight of a phosphite compound, per about 100 parts by weight of a base resin comprising (A)+(B); and (F) about 0.2 to about 6 parts by weight of a HALS compound, a benzotriazol based compound or a combination thereof, per about 100 parts by weight of a base resin comprising (A)+(B).

In other exemplary embodiments, the thermoplastic resin composition may comprise (A) about 50 to about 80 parts by weight of an epoxy group-containing styrenic resin; (B) about 20 to about 50 parts by weight of a polyester resin; (C) about 0.5 to about 7 parts by weight of a thermoplastic polyester resin comprising a cycloaliphatic diol such as cyclohexane dimethanol, per about 100 parts by weight of a base resin comprising (A)+(B); (D) about 0.1 to about 1 parts by weight of a hindered phenolic compound, per about 100 parts by weight of a base resin comprising (A)+(B); (E) about 0.1 to about 1 parts by weight of a phosphite compound, per about 100 parts by weight of a base resin comprising (A)+(B); and (F) about 0.3 to about 5 parts by weight of a HALS compound, a benzotriazol based compound or a combination thereof, per about 100 parts by weight of a base resin comprising (A)+(B).

In another exemplary embodiment, the thermoplastic resin composition may comprise (A) about 50 to about 75 parts by weight of an epoxy group-containing styrenic resin; (B) about 25 to about 50 parts by weight of a polyester resin; (C) about 1 to about 5 parts by weight of a thermoplastic polyester resin comprising a cycloaliphatic diol such as cyclohexane dimethanol, per about 100 parts by weight of a base resin comprising (A)+(B); (D) about 0.1 to about 0.5 parts by weight of a hindered phenolic compound, per about 100 parts by weight of a base resin comprising (A)+(B); (E) about 0.1 to about 0.5 parts by weight of a phosphite compound, per about 100 parts by weight of a base resin comprising (A)+(B); and (F) about 0.3 to about 2 parts by weight of a HALS compound, a benzotriazol based compound or a combination thereof, per about 100 parts by weight of a base resin comprising (A)+(B).

The epoxy group-containing styrenic resin (A) may comprise about 5 to about 100% by weight of an epoxy group-containing vinyl copolymer resin ($A_1$) and about 0 to about 95% by weight of a rubber modified styrenic copolymer resin ($A_2$).

In some embodiments, the epoxy group-containing vinyl copolymer resin($A_1$) is a copolymer of about 0.02 to about 5 mol % of an epoxy compound ($A_{11}$) and about 95 about 99.98 mol % of a vinyl compound ($A_{12}$).

The epoxy compound ($A_{11}$) may include epoxy alkyl acrylate, allyl glycidyl ester, aryl glycidyl ester, glycidyl methacrylate, glycidyl acrylate, butadiene monooxide, vinyl glycidyl ether, glycidyl itaconate, and the like. These epoxy compounds can be used alone or in combination with one another.

The rubber modified styrenic copolymer resin ($A_2$) may comprise ($A_{21}$) about 20 to about 100% by weight of a graft copolymer resin and ($A_{22}$) about 0 to about 80% by weight of a copolymer resin.

The polyester resin (B) may have an intrinsic viscosity of about 0.3 to about 1.15 dL/g.

The thermoplastic polyester resin comprising a cycloaliphatic diol such as cyclohexane dimethanol (C) has an intrinsic viscosity of about 0.5 to about 1.0 dL/g.

In exemplary embodiments, the thermoplastic polyester resin comprising a cycloaliphatic diol such as cyclohexane dimethanol (C) can be prepared by polymerizing an acid component and a diol component in the presence of 1,4-cyclohexanedimethanol.

In exemplary embodiments, the thermoplastic polyester resin comprising a cycloaliphatic diol such as cyclohexane dimethanol (C) comprises about 20 to about 60 mol % of 1,4-cyclohexane dimethanol per total acid component.

The hindered phenolic compound (D) may include octadecyl-3-(4-hydroxy-3,5-di-tert-butylphenyl)-propionate, 2,2-methylenebis(4-methyl-6-butylphenol), 1,3,5-trimethyl-2,4,6-tri(3,5-di-tert-butyl-4-hydroxybenzyl)benzene and the like, and combinations thereof.

The phosphite compound (E) may include triphenyl phosphate, tri(nonyl phenyl)phosphite, triisodecyl phosphite, diphenyl-isooctyl-phosphite, bis(2,6-di-tert-butyl-4-methylphenyl)pentaerythritol diphosphite, tris(2,4-di-tert-butylphenyl)phosphite and the like, and combinations thereof.

The HALS compound (F) may include bis(2,2,6,6-tetramethyl-4-piperidinyl)sebacate, bis(1,2,2,6,6-pentamethyl-4-piperidinyl)sebacate and the like, and combinations thereof.

The benzotriazol based compound (F) may include 2-(2-hydroxy-5-methyl phenyl-benzotriazol, 2(-5-chloro-2h benzotriazol-2-yl)-4,6-bis(1,1-dimethylethyl)-phenol, 2-(2h-benzotriazol-2-yl)-4-(1,1,3,3-tetramethylbutyl)phenol, 2-(4,6-diphenyl-1,3,5-triazin-2-yl)-5-hexyloxy-phenol and the like, and combinations thereof.

The thermoplastic resin composition of the present invention may further comprise additives such as antistatic agents, plasticizers, lubricants, thermal stabilizers, antioxidants, light stabilizers, compatibilizers, releasing agents, dispersants, anti-dripping agents, inorganic fillers, dyes, pigments, flame retardants, and the like, and combinations thereof.

In exemplary embodiments, the thermoplastic resin composition may have an Izod impact strength (ASTM D 256, 1/8" notch) of about 50 to about 100 kgf·cm/cm measured in accordance with ASTM D-256 using 1/8" thick specimens; and may exhibit a color change (ΔE) of about 0.1 to about 0.9 measured using a calorimeter (Minolta 3600D) for a specimen with a retention time for 20 minutes after injecting with a 10 oz injection molding machine at 250° C. and a color change (ΔE) of about 0.1 to about 1.8 measured using a calorimeter (Minolta 3600D) accordance with ASTM D 4459 for a specimen exposed for 300 hours.

Another aspect of the present invention provides a molded article produced from the foregoing thermoplastic resin composition. The molded article may include pellets, housings or parts of electrical and electronic goods, parts of automobiles, general goods, construction materials and the like.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Epoxy Group-Containing Styrenic Resin

The epoxy group-containing styrenic resin (A) according to the invention may comprise an epoxy group-containing vinyl copolymer resin ($A_1$) and a rubber modified styrenic copolymer resin ($A_2$).

In an exemplary embodiment, the epoxy group-containing styrenic resin may comprise about 5 to about 100% by weight of an epoxy group-containing vinyl copolymer resin ($A_1$) and about 0 to about 95% by weight of a rubber modified styrenic copolymer resin ($A_2$). In another exemplary embodiment, the epoxy group-containing styrenic resin may comprise about 5 to about 50% by weight of an epoxy group-containing vinyl copolymer resin ($A_1$) and about 50 to about 95% by weight of a rubber modified styrenic copolymer resin ($A_2$). In another exemplary embodiment, the epoxy group-containing styrenic resin may comprise about 10 to about 40% by weight of an epoxy group-containing vinyl copolymer resin ($A_1$) and about 50 to about 90% by weight of a rubber modified styrenic copolymer resin ($A_2$).

The thermoplastic resin composition of the present invention may include the epoxy group-containing styrenic resin (A) in an amount of about 10 to about 99 parts by weight. In another exemplary embodiment, the epoxy group-containing styrenic resin (A) may be used in an amount of about 40 to about 90 parts by weight or about 50 to about 85 parts by weight. In other exemplary embodiments, the epoxy group-containing styrenic resin (A) may be used in an amount of about 50 to about 75 parts by weight. Within these ranges, a good balance of properties such as chemical resistance, impact resistance, and hydrolysis resistance can be obtained. In other exemplary embodiments, the epoxy group-containing styrenic resin (A) may be used in an amount of about 30 to about 40 parts by weight.

($A_1$) Epoxy Group-Containing Vinyl Copolymer Resin

The epoxy group-containing vinyl copolymer resin ($A_1$) of the present invention can be prepared by polymerizing a monomer mixture comprising about 0.02 to about 5 mol % of an epoxy group-containing epoxy compound ($A_{11}$) and about 95 to about 99.98 mol % of a vinyl compound ($A_{12}$).

($A_{11}$) Epoxy Compound

The epoxy compound ($A_{11}$) used in epoxy group-containing vinyl copolymer ($A_1$) is an unsaturated epoxy compound represented by the following chemical formula 1:

[Chemical Formula 1]

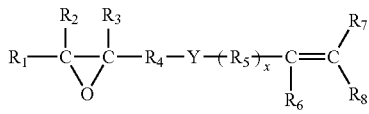

wherein:

$R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or saturated or unsaturated $C_1$-$C_{12}$ alkyl-substituted $C_6$-$C_{14}$ aryl; and Y is an ether group (—O—), carboxyl group (-0-[C=O]—, —[O=C]—O—), $C_1$-$C_{12}$ alkylene, $C_6$-$C_{14}$ arylene, or saturated or unsaturated $C_1$-$C_{12}$ alkyl-substituted $C_6$-$C_{14}$ arylene;

with the proviso that when Y is an ether group (—O—) or carboxyl group (-0-[C=O]—, —[O=C]—O—), $R_4$ and $R_5$ are each independently $C_1$-$C_{12}$ alkylene, $C_6$-$C_{14}$ arylene or saturated or unsaturated $C_1$-$C_{12}$ alkyl-substituted $C_6$-$C_{14}$ arylene, and x is 0 or 1; and when Y is $C_1$-$C_{12}$ alkylene, $C_6$-$C_{14}$ arylene or saturated or unsaturated $C_1$-$C_{12}$ alkyl-substituted $C_6$-$C_{14}$ arylene, Y represents a ($R_4$—Y—$R_5$) structure.

Examples of the unsaturated epoxy compound may include without limitation epoxy alkyl acrylate, allyl glycidyl ester, aryl glycidyl ester, glycidyl methacrylate, glycidyl acrylate, butadiene monoxide, vinyl glycidyl ether, glycidyl itaconate, and the like. These epoxy-based compounds can by used alone or in combination with one another.

The unsaturated epoxy compound is added as a copolymerizable monomer in an amount of about 0.02 to about 5 mol %, for example about 0.05 to about 5 mol %. Within these ranges, it is possible to obtain good impact resistance and to prevent gelation during an extrusion process. In an exemplary embodiment, the unsaturated epoxy compound ($A_{11}$) is used in an amount of about 0.1 to about 5 mol %. In another exemplary embodiment, the unsaturated epoxy compound ($A_{11}$) is used in an amount of about 1 to about 5 mol %. In another exemplary embodiment, the unsaturated epoxy compound ($A_{11}$) is used in an amount of about 3 to about 5 mol %.

($A_{12}$) Vinyl Compound

The vinyl compound ($A_{12}$) used in the epoxy group-containing vinyl copolymer ($A_1$) of the present invention may comprise aromatic vinyl monomers represented by the following chemical formula 2 and a monomer copolymerizable with the aromatic vinyl monomer:

[Chemical Formula 2]

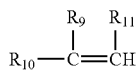

wherein:

$R_9$ is hydrogen or $C_1$-$C_{12}$ alkyl such as methyl and the like;

$R_{10}$ is phenyl, halophenyl, $C_1$-$C_{12}$ alkylphenyl, $C_1$-$C_{12}$ alkyl halophenyl, naphthalene, $C_1$-$C_{12}$ alkyl naphthalene and the like; and $R_{11}$ is hydrogen or $C_1$-$C_{12}$ alkyl such as methyl and the like.

The halophenyl group may have one to three halogen substituent(s). The alkyl phenyl group may have one to two alkyl substituent(s) on the phenyl group. The alkyl halophenyl group may have an alkyl group substituted by halogen or may have both alkyl substituent(s) and halogen substituent(s). The alkyl naphthalene group may have one to four alkyl substituent(s) on the naphthalene group. In an exemplary embodiment, $R_{10}$ is phenyl.

Examples of the aromatic vinyl monomer may include, but are not limited to, styrene, p-t-butylstyrene, α-methyl styrene, β-methyl styrene, p-methyl styrene, ethylstyrene, vinyl xylene, monochlorostyrene, dichlorostyrene, dibromostyrene, vinyl naphthalene and the like. These aromatic vinyl monomers can be used alone or in combination with one another.

Examples of the monomer copolymerizable with the aromatic vinyl monomer may include, but are not limited to, unsaturated nitrile monomers such as acrylonitrile, methacrylonitrile, and ethacrylonitrile. These monomers can be used alone or in combination with one another.

The ratio of the aromatic vinyl monomers to the monomer copolymerizable with the aromatic vinyl monomer can be determined based on compatibility and the ratio of monomers of the rubber modified styrenic copolymer resin ($A_2$) excluding rubber. The vinyl compound may include about 50 to about 100% by weight of an aromatic vinyl monomer and about 0 to about 50% by weight of a monomer copolymerizable with the aromatic vinyl monomer. As another example, the vinyl compound may include about 60 to about 90% by weight of an aromatic vinyl monomer and about 10 to about 40% by weight of a monomer copolymerizable with the aromatic vinyl monomer. Within the ranges, it is possible to obtain sufficient molding performance and good mechanical strength.

In order to improve the properties of the copolymer, the vinyl compound ($A_{12}$) of the present invention may optionally include ethylenic unsaturated monomers such as $C_1$-$C_4$ alkyl(meth)acrylates such as methyl methacrylate; aromatic (meth)acrylates such as phenyl acrylate, phenyl methacrylate, benzyl acrylate, benzyl methacrylate, 2-phenyl ethyl acrylate, 2-phenyl ethyl methacrylate, 2-phenoxyethyl acrylate, and 2-phenoxy ethyl methacrylate; N-substituted maleimides such as N-methyl maleimide, N-phenyl maleimide and N-cyclohexyl maleimide; dicarboxylics acid such as maleic acid, fumaric acid, itaconic acid and anhydrides thereof, acrylic acid and methacrylic acid; nitrogen functional monomers such as dimethylaminoethyl acrylate, diethylaminoethyl acrylate, vinylimidazole, vinylpyrrolidone, vinylcaprolactam, vinylcarbazole, vinylaniline, acrylamide and methacrylamide, and the like, and combinations thereof. These monomers may be used in an amount of about 0 to about 30% by weight, for example about 1 to about 20% by weight, and as another example about 2 to about 15% by weight, per total weight of the vinyl compound ($A_{12}$).

The vinyl compound ($A_{12}$) can be added as a copolymerizable monomer in an amount of about 95 to about 99.98 mol %.

($A_2$) Rubber Modified Styrenic Copolymer Resin

The rubber modified aromatic vinyl copolymer resin ($A_2$) according to the present invention can be a polymer in which rubbery polymers are dispersed in the form of particles in a matrix (continuous phase) comprising an aromatic vinyl polymer. The rubber modified aromatic vinyl resins may be prepared by polymerizing the aromatic vinyl group-containing monomers with rubbery polymers, and selectively monomers copolymerizable with the aromatic vinyl monomer may be added thereto. The rubber modified aromatic vinyl copolymer resin may be prepared by methods such as emulsion polymerization, suspension polymerization, and bulk polymerization. Conventionally, the rubber modified aromatic vinyl resins are prepared by extruding a graft copolymer resin and a copolymer resin, after each is prepared separately. In bulk polymerization, both a graft copolymer resin and a copolymer resin are prepared together in one process. Regardless of the polymerization method used, the rubber content in a final rubber modified styrenic copolymer resin ($A_2$) is about 5 to about 30% by weight.

In the present invention, in order to obtain desirable properties in the alloy of the rubber modified styrenic copolymer resin and polyester resin, the Z-average size of rubber particles of the rubber can range from about 0.1 to about 6.0 µm, for example about 0.25 to about 3.5 µm.

The rubber modified styrenic copolymer resin used in the present invention can be prepared by using a graft copolymer resin alone or using a graft copolymer resin and copolymer resin together, taking into consideration the compatibility of each.

In exemplary embodiments of the invention, the rubber modified styrenic copolymer resin ($A_2$) may include acrylonitrile-butadiene-styrene (ABS) copolymer resins, acrylonitrile-ethylenepropylene rubber-styrene (AES) copolymer resins, acrylonitrile-acrylic rubber-styrene (AAS) copolymer resins, and the like, and combinations thereof.

In exemplary embodiments of the invention, the rubber modified styrenic copolymer resin ($A_2$) of the present invention may comprise about 20 to about 100% by weight of the graft copolymer resin ($A_{21}$) and about 0 to about 80% by weight of the copolymer resin ($A_{22}$). In another exemplary embodiment, the rubber modified styrene copolymer resin ($A_2$) may comprise about 50 to about 95% by weight of the graft copolymer resin ($A_{21}$) and about 5 to about 50% by weight of the copolymer resin ($A_{22}$).

($A_{21}$) Graft Copolymer Resin

The graft copolymer resin ($A_{21}$) of the present invention may be prepared by graft-copolymerizing rubbery polymers, aromatic vinyl monomers, monomers copolymerizable with the aromatic vinyl monomers, and optionally other monomers imparting processability and heat resistance.

Examples of the rubbery polymers may include diene rubbers such as polybutadiene, poly(styrene-butadiene), poly (acrylonitrile-butadiene), and the like; saturated rubbers in which hydrogen is added to the diene rubbers; isoprene rubbers; acryl rubbers such as polybutyl acrylic acid; terpolymers of ethylene-propylene-diene (EPDM), and the like, and combinations thereof. The rubbery polymer may be used in an amount of about 5 to about 65 parts by weight based on about 100 parts by weight of the graft copolymer resin ($A_{21}$). The average size of the rubber particles can range from about 0.1 to about 4 µm, depending on the desired impact strength and appearance of the resin composition.

Examples of the aromatic vinyl monomer may include, but are not limited to, styrene, α-methyl styrene, β-methyl styrene, p-methyl styrene, p-t-butylstyrene, ethyl styrene, vinyl xylene, monochlorostyrene, dichlorostyrene, dibromostyrene, vinyl naphthalene and the like, and combinations thereof. The aromatic vinyl monomer may be used in an amount of about 35 to about 95 parts by weight based on the total weight of the graft copolymer resin ($A_{21}$).

The graft copolymer resin ($A_{21}$) may include at least one other monomer copolymerizable with the aromatic vinyl monomer. Examples of the copolymerizable monomer may include vinyl cyanide compounds such as acrylonitrile, unsaturated nitrile-containing compounds such as methacrylonitrile and ethacrylonitrile, and the like. These monomers may be used alone or in combination with one another. The monomer copolymerizable with the aromatic vinyl monomer may be used in an amount of about 1 to about 20 parts by weight, based on the total weight of the graft copolymer resin ($A_{21}$).

Examples of the monomers imparting processability and heat resistance may include acrylic acid, methacrylic acid, maleic anhydride, N-substituted maleimide, and the like, and combinations thereof. The monomers imparting processability and heat resistance may be used in an amount of about 0 to about 15 parts by weight, based on the total weight of the graft copolymer resin ($A_{21}$).

($A_{22}$) Copolymer Resin

The copolymer resin ($A_{22}$) of the present invention may be prepared by copolymerizing aromatic vinyl monomers, monomers copolymerizable with the aromatic vinyl monomers, and optionally other monomers imparting processability and heat resistance. The ratio of the monomers may be adjusted depending on the compatibility of each component and ratio of monomer excluding the rubber in the components of the graft copolymer resin ($A_{21}$).

Examples of the aromatic vinyl monomers may include, but are not limited to, styrene, α-methylstyrene, β-methylstyrene, p-methylstyrene, p-t-butyl styrene, ethyl styrene, vinyl xylene, monochlorostyrene, dichlorostyrene, dibromostyrene, vinyl naphthalene and the like, and combinations thereof. The aromatic vinyl monomers can be used in an amount of about 60 to about 90 parts by weight, based on the total weight of the copolymer resin ($A_{22}$).

Examples of the monomer copolymerizable with the aromatic vinyl monomer may include, but are not limited to, a vinyl cyanide compound such as acrylonitrile or an unsaturated nitrile compound such as ethacrylonitrile and methacrylonitrile, and may be used alone or in combination of two or more. The amount of the monomer copolymerizable with the aromatic vinyl monomer can be about 10 to about 40 parts by weight, based on the total weight of the copolymer resin ($A_{22}$).

Examples of the monomers imparting processability and heat resistance may include without limitation acrylic acid, methacrylic acid, maleic anhydride, N-substituted maleimide and the like, and combinations thereof. The monomers imparting processability and heat resistance may be used in an amount of about 0 to about 30 parts by weight, based on the total weight of the copolymer resin ($A_{22}$).

(B) Polyester Resin

Polyester resin used in the present invention is a crystalline polyester resin or a copolymer thereof which has an intrinsic viscosity of about 0.3 to about 1.15 dL/g. In exemplary embodiments, polyester resin having an intrinsic viscosity of about 0.5 to about 1.0 dL/g may be used.

The polyester resin can be prepared by polycondensation of an aromatic dicarboxylic acid or ester thereof and a $C_2$-$C_{12}$ diol, and the preparation can be readily carried out by a person of ordinary skill in the art.

Examples of the aromatic dicarboxylic acid or ester thereof may include without limitation terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, aromatic dicarboxylate in which acid is substituted with a dimethyl group such as dimethyl terephthalate (DMT) and dimethyl isophthalate, alkyl esters of naphthalene dicarboxylate, dimethyl-1,2-naphthalate, dimethyl-1,5-naphthalate, dimethyl-1,7-naphthalate, dimethyl-1,7-naphthalate, dimethyl-1,8- naphthalate, dimethyl-2,3-naphthalate, dimethyl-2,6-naphthalate, dimethyl-2,7-naphthalate, and the like, and combinations thereof.

Examples of the diols having 2 to 12 carbon atoms may include without limitation ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol, and the like and combinations thereof.

In exemplary embodiments of the invention, the polyester resin may be mixed with inorganic particles by conventional methods. Examples of suitable inorganic particles useful in the invention may include without limitation titanium dioxide ($TiO_2$), silicone dioxide ($SiO_2$), aluminum hydroxide ($Al(OH)_3$) and the like, and combinations thereof. The inorganic particles may be used in an amount of about 0.1 to 30 parts by weight per about 100 parts by weight of a polyester resin.

In the present invention, the polyester resin (B) is part of a base resin and used in the resin composition of the present invention in an amount of about 1 to about 90 parts by weight. If the amount of the polyester resin is less than about 1 part, the resin composition may not obtain good impact resistance. If the amount of the polyester resin is more than about 90 parts by weight, the resin composition may have a poor balance of properties. In an exemplary embodiment, the polyester resin (B) may be used in an amount of about 5 to about 50 parts by weight. In another exemplary embodiment, the polyester resin (B) may be used in an amount of about 10 to about 45 parts by weight. In another exemplary embodiment, the polyester resin (B) may be used in an amount of about 20 to about 40 parts by weight. These ranges can provide a desirable balance of physical properties such as chemical resistance, impact resistance and hydrolysis resistance.

(C) Thermoplastic Polyester Resin Comprising a Cycloaliphatic Diol

The thermoplastic polyester resin comprising a cycloaliphatic diol, such as cyclohexane dimethanol, used in the present invention is a non-crystalline polyester resin which has an intrinsic viscosity of about 0.5 to about 1.0 dL/g. In exemplary embodiments, polyester resin having an intrinsic viscosity of about 0.6 to about 0.8 dL/g may be used.

The thermoplastic polyester resin comprising a cycloaliphatic diol such as cyclohexane dimethanol can be prepared by polymerizing an acid component and diol component in the presence of a cycloaliphatic diol such as cyclohexane dimethanol.

Examples of the acid component may include without limitation aromatic dicarboxylic acids such as terephthalic acid, isophthalic acid, 4,4'-diphenyldicarboxylic acid, 4,4'-diphenoxyethane dicarboxylic acid, 4,4'-diphenyl sulphone dicarboxylic acid and structural isomer thereof, aliphatic dicarboxylic acids such as malonic acid, succinic acid and adipic acid; other acids such as hydroxybenzoic acid, hydroxybenzoate, glycolic acid and derivatives thereof, and the like and combinations thereof.

Examples of the diol component may include without limitation ethylene glycol, 1,3-propanediol, 1,4-butanediol, pentamethylene glycol, hexamethylene glycol, neopentylglycol, and diethylene glycol; derivatives of aromatic dihydroxy compounds such as bisphenol A and bisphenol S, or other diols; and the like, and combinations thereof.

The thermoplastic polyester resin (C) further includes a cycloaliphatic diol. In exemplary embodiments of the invention, 1,4-cyclohexane dimethanol may be used.

In exemplary embodiments, the thermoplastic polyester resin comprising a cycloaliphatic diol may be a polymer prepared by polymerizing the acid component and the diol component in the presence of 1,4-cyclohexane dimethanol.

In exemplary embodiments, the thermoplastic polyester resin comprising a cycloaliphatic diol such as cyclohexane dimethanol is a copolymer comprising about 10 to about 80 mol % of cycloaliphatic diol, about 10 to about 80 mol % of aromatic dicarboxylic acid, and about 10 to about 80 mol % of $C_2$-$C_5$ alkylene glycol.

In exemplary embodiments, the thermoplastic polyester resin comprising a cycloaliphatic diol such as cyclohexane dimethanol is a copolymer comprising 1,4-cyclohexane dimethanol, terephthalic acid and ethylene glycol. 1,4-cyclohexane dimethanol may be used in an amount of about 0.1 to about 99 mol %, for example about 20 to about 60 mol %, per acid component. In exemplary embodiments, 1,4-cyclohexane dimethanol may be used in an amount of about 25 to about 50 mol %, per total thermoplastic polyester resin comprising cyclohexane dimethanol (C).

In exemplary embodiments, the thermoplastic polyester resin comprising a cycloaliphatic diol such as cyclohexane dimethanol may be a glycol modified polyethylene terephthalate (PETG).

The thermoplastic polyester resin comprising a cycloaliphatic diol such as cyclohexane dimethanol (C) may be used in the resin composition of the present invention in an amount of about 0.1 to about 10 parts by weight, per about 100 parts by weight of a base resin comprising (A)+(B). These ranges can provide an optimum balance of physical properties such as heat stability and appearance. In an exemplary embodiment, the thermoplastic polyester resin comprising a cycloaliphatic diol such as cyclohexane dimethanol (C) may be used in an amount of about 0.5 to about 7 parts by weight, for example about 0.7 to about 5 parts by weight, and as another example about 0.1 to about 5 parts by weight.

(D) Hindered Phenolic Compound

The hindered phenolic compound can be used as a primary antioxidant which is readily commercially available.

Examples of the hindered phenolic compound may include without limitation octadecyl-3-(4-hydroxy-3,5-di-tert-butylphenyl)-propionate, 2,2-methylenebis(4-methyl-6-butylphenol) and 1,3,5-tri-methyl-2,4,6-tri(3,5-di-tert-butyl-4-hydroxybenzyl)benzene. These hindered phenolic compounds can be used alone or in combination with one another.

The hindered phenolic compound may be used in an amount of about 0.05 to about 2 parts by weight, for example about 0.1 to about 1.5 parts by weight, and as another example about 0.1 to about 1 part by weight, per about 100 parts by weight of a base resin comprising (A)+(B). In an exemplary embodiment, the hindered phenolic compound may be used in an amount of about 0.2 to about 0.5 parts by weight. If the amount of the hindered phenolic compound is less than about 0.05 parts by weight, the resin composition may not obtain sufficient heat stability. If the amount of the hindered phenolic compound is more than about 2 parts by weight, it may cause gas release.

(E) Phosphite Compound

In the invention, the phosphite compound can be used as a secondary antioxidant.

Examples of the phosphite compound may include without limitation triphenyl phosphate, tri(nonyl phenyl) phosphite, triisodecyl phosphite, diphenyl-isooctyl-phosphite, bis(2,6-di-tert-butyl-4-methylphenyl)pentaerythritol diphosphite, tris(2,4-di-tert-butylphenyl) phosphate and the like. These phosphite compounds can be used alone or in combination with one another.

The phosphite compound may be used in an amount of about 0.05 to about 4 parts by weight, for example about 0.07 to about 2 parts by weight, and as another example about 0.1 to about 1 part by weight, per about 100 parts by weight of a base resin comprising (A)+(B). If the amount of the phosphite compound is less than about 0.05 parts by weight, the resin composition may not obtain sufficient heat stability. If the amount of the phosphite compound is more than about 4 parts by weight, it may cause gas release. In another exemplary embodiment, the phosphite compound may be used in an amount of about 0.1 to about 0.5 parts by weight.

(F) HALS Compound and Benzotriazol Based Compound

In the invention, a HALS compound, a benzotriazol based compound or a combination thereof may be used to improve light stability of the resin composition.

Examples of the HALS compound (F) may include without limitation bis(2,2,6,6-tetramethyl-4-piperidinyl)sebacate, bis(1,2,2,6,6-pentamethyl-4-piperidinyl)sebacate and the like, and combinations thereof.

Examples of the benzotriazol based compound may include without limitation 2-(2-hydroxy-5-methyl phenyl-benzotriazol, 2(-5-chloro-2h benzotriazol-2-yl)-4,6-bis(1,1-dimethylethyl)-phenol, 2-(2h-benzotriazol-2-yl)-4-(1,1,3,3-tetramethylbutyl)phenol, 2-(4,6-diphenyl-1,3,5-triazin-2-yl)-5-hexyloxy-phenol and the like, and combinations thereof.

These HALS and benzotriazol based compounds may be used alone or in combination with one another. If the HALS and benzotriazol based compounds are used together, the resin composition may have improved light resistance as well as good heat stability.

The HALS and/or benzotriazol based compound may be used in an amount of about 0.2 to about 6 parts by weight, for example about 0.3 to about 5 parts by weight, and as another example about 0.5 to about 2 parts by weight, per about 100 parts by weight of a base resin comprising (A)+(B). In an exemplary embodiment, the HALS and/or benzotriazol based compound may be used in an amount of about 0.7 to about 1.5 parts by weight.

The thermoplastic resin composition of the present invention may further comprise additives such as antistatic agents, plasticizers, lubricants, thermal stabilizers, antioxidants, light stabilizers, compatibilizers, releasing agents, dispersants, anti-dripping agents, inorganic fillers, dyes, pigments, flame retardants, and the like. These additives may be used alone or in combination with one another.

The thermoplastic resin composition of the present invention can have an Izod impact strength (ASTM D 256, ⅛" notch) of about 50 to about 100 kgf·cm/cm; and can exhibit a color change ($\Delta E$) of about 0.1 to about 0.9 measured using a calorimeter (Minolta 3600D) for a specimen with a retention time for 20 minutes after injecting with a 10 oz injection molding machine at 250° C. and a color change ($\Delta E$) of about 0.1 to about 1.8 measured using a calorimeter (Minolta 3600D) accordance with ASTM D 4459 for a specimen exposed for 300 hours.

Another aspect of the present invention provides a molded article molded from the foregoing thermoplastic resin composition. The molded article can be prepared by a conventional process. For example, all the components and additives can be mixed together and extruded through an extruder and can be prepared in the form of pellets.

The thermoplastic resin composition of the invention may be molded into various articles. The articles may include pellets, housings or parts of electrical and electronic goods, parts of automobiles, general goods, construction materials and the like. The resin composition of the invention can be particularly suitable for the housings of electric/electronic appliances, computer housings, office equipment housings, construction materials, and the like.

The invention may be better understood by reference to the following examples which are intended for the purpose of illustration and are not to be construed as in any way limiting the scope of the present invention, which is defined in the claims appended hereto.

EXAMPLES (A) Epoxy Group-Containing Styrenic Resin ($A_1$) Epoxy Group-Containing Vinyl Copolymer (GMA 5.0 mol %—SAN)

To a mixture comprising 100 parts by weight of monomer mixture including 5.0 mol % of glycidyl methacrylate and 70 mol % of styrene and 25 mol % of acrylonitrile, are added 120 parts by weight of deionized water, 0.2 parts by weight of azobisisobutyronitrile, 0.4 parts by weight of tricalcium phosphate, and 0.2 parts by weight of mercaptan-containing chain transfer agent. Then the temperature of the mixture is increased from room temperature to 80° C. for 60 minutes. After maintaining this temperature for 180 minutes, an epoxy group-containing styrene-acrylonitrile copolymer resin (GMA-SAN) is obtained. The resultant product is washed, dehydrated and dried to obtain an epoxy group-containing styrene-acrylonitrile copolymer resin (GMA-SAN) in powder form.

($A_2$) Rubber Modified Styrene Resin ($A_{21}$) Graft Copolymer Resin 50 parts by weight of butadiene rubber latex, 36 parts by weight of styrene, 14 parts by weight of acrylonitrile, and 150 parts by weight of deionized water are mixed. To the mixture, 1.0 part of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate are added. The blend is kept at 75° C. for 5 hours to obtain a graft copolymer (g-ABS) latex. To the g-ABS latex, 0.4 parts of sulfuric acid is added, coagulated and dried to obtain a graft copolymer resin (g-ABS) in powder form. The average size of the rubber particles is 0.3 μm.

($A_{22}$) Copolymer Resin 75 parts of styrene, 25 parts of acrylonitrile, and 120 parts of deionized water are mixed. To the mixture, 0.2 parts of azobisisobutylonitrile (AIBN), 0.4 parts of tricalciumphosphate and 0.2 parts of mercaptan-containing chain transfer agent are added. The resultant solution is heated to 80° C. for 90 minutes and kept for 180 minutes, and a styrene-acrylonitrile copolymer resin (SAN) is obtained. The resultant product is washed, dehydrated and dried to obtain a styrene-acrylonitrile copolymer resin (SAN) in powder form.

(B) Polyester Resin (B1) Polyester resin having an intrinsic viscosity of 0.76 dl/g manufactured by Anychem Company (product name: A 1100) is used.

(B2) Polyester resin having an intrinsic viscosity of 0.72 dl/g manufactured by Samyang Company (product name: Clear PET Flake) is used.

(C) Thermoplastic Polyester Resin Comprising Cyclohexane Dimethanol

SKYGREEN S2008 manufactured by SK Chemical Co., Ltd. having an intrinsic viscosity of 0.8 dl/g and cyclohexane dimethanol (CHDM) of 25% is used.

(D) Hindered Phenolic Compound (D1) Octadecyl-3-(3,5-di-tert.butyl-4-hydroxyphenyl)-propionate (IRGANOX 1076) is used.

(D2) 2,2-methylenebis(4-methyl-6-butylphenol) is used.

(E) Phosphite Compound (E1) Bis(2,6-di-tert-butyl-4-methylphenyl)pentaerythritol diphosphite is used.
(E2) Tris(2,4-di-tert-butylphenyl)phosphite is used.

(F) HALS Compound and Benzotriazol Based Compound (F1) Bis(2,2,6,6-tetramethyl-4-piperidinyl)sebacate (TINNUVIN 770) is used.

(F2) 2-(2-hydroxy-5-methyl phenyl-benzotriazol (HISORB-P) is used.

Examples 1-5

The components as shown in Table 1 are mixed in a Hansel mixer for 3-10 minutes to prepare a mixture. The mixture is fed into a conventional twin screw extruder at a speed of 30-60 kg/hr and extruded at 180-280° C. at a screw speed of 150-300 rpm as pellets. After drying at 80° C. for 3 hours, the resin pellets are molded into test specimens using a 6-oz injection molding machine at 180-280° C. with a barrel temperature of 40-80° C. The physical properties, the heat stability and light stability are measured after leaving the specimens at 23° C. and 50% of relative humidity for 40 hours. The results are shown in Table 1.

Comparative Examples 1-5

Comparative Examples 1-5 are prepared in the same manner as Examples, except with the amounts of components as specified in Table 1.

Physical properties of specimens are measured by the following methods.

(1) Impact strength: Notched Izod impact strength is measured in accordance with ASTM-D256 at a sample thickness of 1/8". The final test results are obtained by calculating an average value from 5 test results (kgf·cm/cm).

(2) Heat stability: The heat stability is evaluated as a color change (ΔE) using a calorimeter (Minolta 3600D). The specimen is a 50 mm*90 mm*3 mm specimen prepared by injection molding the composition using a 10 oz injection molding machine at 250° C. and then placing the specimen in a gear oven for 20 minutes.

(3) Appearance: The appearance of a 50 mm*90 mm*3 mm specimen is measured with the naked eye after retaining the specimen for 20 minutes in a gear oven (○: good, : normal, ×: poor).

(4) Light stability: The light stability is evaluated as a color change (ΔE) using a calorimeter (Minolta 3600D) in accordance with ASTM D 4459 for a specimen exposed for 300 hours.

TABLE 1

|  |  | Examples | | | | | Comparative Examples | | | | |
|---|---|---|---|---|---|---|---|---|---|---|---|
|  |  | 1 | 2 | 3 | 4 | 5 | 1 | 2 | 3 | 4 | 5 |
| Epoxy group-containing styrenic resin (A) | A1 | 15 | 15 | 15 | 15 | 15 | 15 | 15 | 15 | 15 | 15 |
|  | $A_{21}$ | 25 | 25 | 25 | 25 | 25 | 25 | 25 | 25 | 25 | 25 |
|  | $A_{22}$ | 20 | 20 | 20 | 20 | 20 | 20 | 20 | 20 | 20 | 20 |
| Polyester | B1 | 40 | 40 | 40 | 40 | — | 40 | 40 | 40 | 40 | 40 |
|  | B2 | — | — | — | — | 40 | — | — | — | — | — |
| PETG resin | C | 3 | 3 | 3 | 3 | 3 | — | — | — | 3 | — |
| hindered phenolic compound | D1 | 0.2 | 0.2 | 0.2 | 0.2 | 0.2 | 0.3 | — | — | 0.3 | 0.2 |
|  | D2 | 0.1 | 0.1 | 0.1 | 0.1 | 0.1 | — | 0.3 | — | — | 0.1 |
| phosphite compound | E1 | — | 0.2 | — | 0.2 | 0.2 | — | — | — | — | — |
|  | E2 | 0.2 | — | 0.2 | — | — | — | — | 0.3 | — | 0.2 |
| UV Stabilizer | F1 | 0.5 | 0.5 | 0.5 | 0.5 | 0.5 | — | — | — | — | — |
|  | F2 | — | — | 0.5 | 0.5 | 0.5 | — | — | — | — | — |
| Impact strength (1/8" kgf cm/cm) |  | 51.3 | 57.6 | 55.7 | 58.4 | 61.5 | 44.8 | 51.6 | 49.7 | 51.8 | 56.2 |
| Heat stability |  | 0.89 | 0.64 | 0.6 | 0.47 | 0.53 | 1.47 | 1.18 | 1.15 | 1.0 | 1.0 |
| Appearance |  | ○ | ○ | ○ | ○ | ○ | X | | | X | |
| Light stability |  | 1.75 | 1.55 | 1.50 | 1.42 | 1.46 | 1.89 | 1.76 | 1.72 | 2.5 | 1.7 |

As shown in Table 1, the resin compositions of Examples 1-5 exhibit better heat stability and light stability, compared to Comparative Examples and show good impact strength and appearance.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
about 100 parts by weight of a binary base resin comprising (A) about 10 to about 99 parts by weight of an epoxy group-containing styrenic resin and (B) about 1 to about 90 parts by weight of a polyester resin; wherein said epoxy group-containing styrenic resin (A) comprises about 5 to about 50% by weight of an epoxy group-containing vinyl copolymer resin ($A_1$) and about 50 to about 95% by weight of a rubber modified styrenic copolymer resin ($A_2$);
(C) about 0.1 to about 10 parts by weight of a thermoplastic polyester resin, per about 100 parts by weight of the binary base resin; wherein said thermoplastic polyester resin (C) is prepared by polymerization of acid components and diol components, and the diol components comprise a cycloaliphatic diol;

(D) about 0.05 to about 2 parts by weight of a hindered phenolic compound, per about 100 parts by weight of the binary base resin;

(E) about 0.05 to about 4 parts by weight of a phosphite compound, per about 100 parts by weight of the binary base resin; and (F) about 0.2 to about 6 parts by weight of a compound comprising a HALS compound, benzotriazol based compound, or a combination thereof, per about 100 parts by weight of the binary base resin.

2. The thermoplastic resin composition of claim 1, wherein said epoxy group-containing vinyl copolymer resin ($A_1$) is a copolymer comprising about 0.02 to about 5 mol % of an epoxy compound ($A_{11}$) and about 95 about 99.98 mol % of a vinyl compound ($A_{12}$).

3. The thermoplastic resin composition of claim 2, wherein said epoxy compound ($A_{11}$) is represented by the following chemical formula 1:

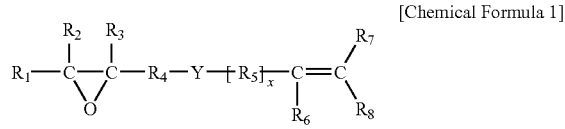

[Chemical Formula 1]

wherein:
$R_1$, $R_2$, $R_3$, $R_6$, $R_7$ and $R_8$ are each independently hydrogen, saturated or unsaturated $C_1$-$C_{12}$ alkyl, $C_6$-$C_{14}$ aryl, or saturated or unsaturated $C_1$-$C_{12}$ alkyl-substituted $C_6$-$C_{14}$ aryl; and Y is an ether group (—O—), carboxyl group (-0-[C=O]—, —[O=C]—O—), $C_1$-$C_{12}$ alkylene, $C_6$-$C_{14}$ arylene, or saturated or unsaturated $C_1$-$C_{12}$ alkyl-substituted $C_6$-$C_{14}$ arylene;

with the proviso that when Y is an ether group (—O—) or carboxyl group (-0-[C=O]—, —[O=C]—O—), $R_4$ and $R_5$ are each independently $C_1$-$C_{12}$ alkylene, $C_6$-$C_{14}$ arylene or saturated or unsaturated $C_1$-$C_{12}$ alkyl-substituted $C_6$-$C_{14}$ arylene, and x is 0 or 1; and when Y is $C_1$-$C_{12}$ alkylene, $C_6$-$C_{14}$ arylene or saturated or unsaturated $C_1$-$C_{12}$ alkyl-substituted $C_6$-$C_{14}$ arylene, Y represents a ($R_4$—Y—$R_5$) structure.

4. The thermoplastic resin composition of claim 3, wherein said epoxy compound ($A_{11}$) comprises epoxy alkyl acrylate, allyl glycidyl ester, aryl glycidyl ester, glycidyl methacrylate, glycidyl acrylate, butadiene monooxide, vinyl glycidyl ether, glycidyl itaconate or a combination thereof.

5. The thermoplastic resin composition of claim 1, wherein said rubber modified styrenic copolymer resin ($A_2$) comprises ($A_{21}$) about 20 to about 100% by weight of a graft copolymer resin and ($A_{22}$) about 0 to about 80% by weight of a copolymer resin.

6. The thermoplastic resin composition of claim 1, wherein said polyester resin (B) has an intrinsic viscosity of about 0.3 to about 1.15 dL/g.

7. The thermoplastic resin composition of claim 1, wherein said thermoplastic polyester resin (C) has an intrinsic viscosity of about 0.5 to about 1.0 dL/g.

8. The thermoplastic resin composition of claim 1, wherein said thermoplastic polyester resin (C) is prepared by polymerization of acid components and diol components, and the diol components comprise 1,4-cyclohexane dimethanol.

9. The thermoplastic resin composition of claim 8, wherein the 1,4-cyclohexane dimethanol is provided in an amount of about 0.1 to about 99 mol %, per total acid components.

10. The thermoplastic resin composition of claim 8, wherein the 1,4-cyclohexane dimethanol is provided in an amount of about 20 to about 60 mol % per total acid components.

11. The thermoplastic resin composition of claim 1, wherein said hindered phenolic compound (D) comprises octadecyl-3-(4-hydroxy-3,5-di-tert-butylphenyl)-propionate, 2,2-methylenebis(4-methyl-6-butylphenol), 1,3,5-trimethyl-2,4,6-tri(3,5-di-tert-butyl-4-hydroxybenzyl)benzene, or a combination thereof.

12. The thermoplastic resin composition of claim 1, wherein said phosphite compound (E) comprises triphenyl phosphate, tri(nonyl phenyl)phosphite, triisodecyl phosphite, diphenyl-isooctyl-phosphite, bis(2,6-di-tert-butyl-4-methylphenyl)pentaerythritol diphosphite, tris(2,4-di-tert-butylphenyl)phosphite, or a combination thereof.

13. The thermoplastic resin composition of claim 1, wherein said HALS compound (F) comprises bis(2,2,6,6-tetramethyl-4-piperidinyl)sebacate, bis(1,2,2,6,6-pentamethyl-4-piperidinyl)sebacate, or a combination thereof.

14. The thermoplastic resin composition of claim 1, wherein said benzotriazol based compound (F) comprises 2-(2-hydroxy-5-methyl phenyl-benzotriazol, 2-(-5-chloro-2h benzotriazol-2-yl)-4,6-bis(1,1-dimethylethyl)-phenol, 2-(2h-benzotriazol-2-yl)-4-(1,1,3,3-tetramethylbutyl)phenol, 2-(4,6-diphenyl-1,3,5-triazin-2-yl)-5-hexyloxy-phenol, or a combination thereof.

15. The thermoplastic resin composition of claim 1, wherein said resin composition comprises:
about 100 parts by weight of said binary resin comprising (A) about 50 to about 75 parts by weight of said epoxy group-containing styrenic resin and (B) about 25 to about 50 parts by weight of said polyester resin;

(C) about 1 to about 5 parts by weight of said thermoplastic polyester resin per about 100 parts by weight of the binary base resin;

(D) about 0.1 to about 0.5 parts by weight of said hindered phenolic compound, per about 100 parts by weight of the binary base resin;

(E) about 0.1 to about 0.5 parts by weight of said phosphite compound, per about 100 parts by weight of the binary base resin; and (F) about 0.3 to about 2 parts by weight of said HALS compound, benzotriazol based compound or combination thereof, per about 100 parts by weight of the binary base resin.

16. The thermoplastic resin composition of claim 1, further comprising at least one additive comprising an antistatic agent, plasticizer, lubricant, thermal stabilizer, antioxidant, light stabilizer, compatibilizer, releasing agent, dispersant, anti-dripping agent, inorganic filler, dye, pigment, flame retardant, or a combination thereof.

17. The thermoplastic resin composition of claim 1, wherein said resin composition has an Izod impact strength (ASTM D 256, ⅛" notch) of about 50 to about 100 kgf·cm/cm measured in accordance with ASTM D-256 using ⅛" thick specimens; and exhibits a color change (ΔE) of about 0.1 to about 0.9 measured using a colorimeter (Minolta 3600D) for a specimen with a retention time for 20 minutes after injecting with a 10 oz injection molding machine at 250° C. and a color change (ΔE) of about 0.1 to about 1.8 measured using a colorimeter (Minolta 3600D) accordance with ASTM D 4459 for a specimen exposed for 300 hours.

18. The thermoplastic resin composition of claim 1, wherein (B) is a crystalline polyester resin.

19. The thermoplastic resin composition of claim 18, comprising (B) about 1 to about 50 parts by weight of crystalline polyester resin.

20. A molded article produced from the thermoplastic resin composition as defined by claim 1.

* * * * *

UNITED STATES PATENT AND TRADEMARK OFFICE
CERTIFICATE OF CORRECTION

PATENT NO. : 8,080,618 B2
APPLICATION NO. : 12/477530
DATED : December 20, 2011
INVENTOR(S) : Jun Myung Kim et al.

Page 1 of 1

It is certified that error appears in the above-identified patent and that said Letters Patent is hereby corrected as shown below:

In the Specification

Column 4, Line 4 reads "measured using a calorimeter (Minolta 3600D) for a speci-"
and should read "measured using a colorimeter (Minolta 3600D) for a speci-"

Column 4, Line 8 reads "calorimeter (Minolta 3600D) accordance with ASTM D 4459"
and should read "colorimeter (Minolta 3600D) accordance with ASTM D 4459"

Column 11, Line 51 reads "calorimeter (Minolta 3600D) for a specimen with a retention"
and should read "colorimeter (Minolta 3600D) for a specimen with a retention"

Column 11, Line 54 reads "0.1 to about 1.8 measured using a calorimeter (Minolta"
and should read "0.1 to about 1.8 measured using a colorimeter (Minolta"

Column 13, Line 67 reads "change (ΔE) using a calorimeter (Minolta 3600D). The speci-"
and should read "change (ΔE) using a colorimeter (Minolta 3600D). The speci-"

Column 14, Line 12 reads "change (ΔE) using a calorimeter (Minolta 3600D) in accor-"
and should read "change (ΔE) using a colorimeter (Minolta 3600D) in accor-"

Signed and Sealed this
First Day of May, 2012

David J. Kappos
*Director of the United States Patent and Trademark Office*